(12) United States Patent
Uwague-Igharo

(10) Patent No.: US 8,696,058 B2
(45) Date of Patent: Apr. 15, 2014

(54) ADJUSTABLE ARMREST WITH ADJUSTABLE CUPHOLDER

(75) Inventor: Okunzuwa Uwague-Igharo, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 670 days.

(21) Appl. No.: 12/901,618

(22) Filed: Oct. 11, 2010

(65) Prior Publication Data

US 2012/0086244 A1 Apr. 12, 2012

(51) Int. Cl.
*A47C 7/54* (2006.01)
*B60N 2/46* (2006.01)

(52) U.S. Cl.
USPC .................. 297/188.17; 297/188.14

(58) Field of Classification Search
USPC ......... 297/188.14–188.19, 411.32; 248/311.2
See application file for complete search history.

(56) References Cited

U.S. PATENT DOCUMENTS

| | | | |
|---|---|---|---|
| 4,759,584 A | | 7/1988 | Dykstra et al. |
| 5,096,152 A | * | 3/1992 | Christiansen et al. ..... 248/311.2 |
| 5,102,085 A | * | 4/1992 | Wieczorek et al. ........ 248/311.2 |
| 5,104,187 A | * | 4/1992 | Fischer et al. ........... 297/188.16 |
| 5,131,716 A | * | 7/1992 | Kwasnik et al. ......... 297/188.16 |
| 5,150,946 A | * | 9/1992 | Marfilius et al. ......... 297/188.15 |
| 5,318,343 A | * | 6/1994 | Spykerman et al. ..... 297/188.16 |
| 5,524,958 A | * | 6/1996 | Wieczorek et al. ...... 297/188.17 |
| 5,562,331 A | | 10/1996 | Spykerman et al. |
| 5,746,363 A | * | 5/1998 | Teller et al. ................... 224/547 |
| 5,762,307 A | * | 6/1998 | Patmore ..................... 248/311.2 |
| 5,800,011 A | * | 9/1998 | Spykerman .............. 297/188.19 |
| 6,834,838 B2 | | 12/2004 | Dennis et al. |
| 7,350,757 B2 | | 4/2008 | Baek |
| 7,533,860 B2 | | 5/2009 | Somuah |
| 7,694,928 B2 | | 4/2010 | Lee et al. |
| 8,136,875 B2 | * | 3/2012 | Laake ...................... 297/188.14 |
| 2006/0266748 A1 | | 11/2006 | Crawford |

* cited by examiner

*Primary Examiner* — David R Dunn
*Assistant Examiner* — Timothy J Brindley
(74) *Attorney, Agent, or Firm* — Clifford B. Vaterlaus; Emerson Thomson Bennett, LLC

(57) ABSTRACT

An armrest may be adjustable between a down position where a cupholder is accessible to hold a cup and an upright position where the cupholder can be used to cushion an occupant that is supported to it.

20 Claims, 7 Drawing Sheets

ADJUSTABLE ARMREST WITH ADJUSTABLE CUPHOLDER

I. BACKGROUND

A. Field of Invention

This invention generally relates to methods and apparatuses concerning armrests and more specifically relates to methods and apparatuses concerning an armrest that is adjustable between down and upright positions and that has an adjustable cupholder.

B. Description of the Related Art

It is well known in the automotive industry to provide armrests that can be adjusted between a "down" position where they serve as armrests and an "upright" position where they serve as a portion of the occupant receiving surface of a seatback. It is also known in the automotive industry to provide cupholders that are suitable to hold a beverage container such as a cup, a can, and a bottle. The cupholders may also be used to hold various other items.

There is a problem, however, when cupholders are used on armrests that can be adjusted between down and upright positions. The problem is that in order to have sufficient cushioning effect when the armrest is in the upright position, the cupholder must have a relatively small depth. This limits the size of beverage containers (or other items) that can be placed into the cupholder.

What is needed, then, is an adjustable armrest that provides a relatively deep cupholder when the armrest is in the down position and that also provides sufficient cushioning when the armrest is in the upright position.

II. SUMMARY

According to one embodiment of this invention, an apparatus may comprise: an armrest having first and second surfaces and wherein: (1) the first surface is suitable to support at least a portion of an associated occupant's arm; and, (2) the second surface is suitable to support at least a portion of the associated occupant's trunk; and, a cupholder supported to the armrest and having a cup receiving opening that extends to the first surface of the armrest, wherein the cupholder comprises a first relative upper wall and a second relative lower wall that is movable with respect to the first wall to change the depth of the cupholder. The armrest may be adjustable between: (1) a first position wherein: (1) the cup receiving opening is accessible to receive an associated cup; and, (b) the cupholder has a first depth; and, (2) a second position wherein: (a) the second surface is accessible to support the at least a portion of the associated occupant's trunk; (b) the cup receiving opening is not accessible; and, (c) the cupholder reduces to a second depth that is less than the first depth when the at least a portion of the associated occupant's trunk is supported to the second surface and consequently a compression force is applied to the second surface.

According to another embodiment of this invention, a method may comprise the steps of: (A) providing an armrest having first and second surfaces and wherein: (1) the first surface is suitable to support at least a portion of an associated occupant's arm; and, (2) the second surface is suitable to support at least a portion of the associated occupant's trunk; (B) providing a cupholder supported to the armrest and having a cup receiving opening that extends to the first surface of the armrest and wherein the cupholder comprises a first relative upper wall and a second relative lower wall; (C) providing the armrest in a first position where the cup receiving opening is accessible to receive an associated cup and the cupholder has a first depth; (D) adjusting the armrest into a second position where the second surface is accessible and the cup receiving opening is not accessible; and, (E) supporting the at least a portion of the occupant's trunk to the second surface of the armrest and consequently: (1) applying a compression force onto the second surface; and, (2) moving the second wall with respect to the first wall to reduce the depth of the cupholder to a second depth that is less than the first depth.

According to yet another embodiment of this invention, an apparatus may comprise: an automotive seat assembly comprising: (1) a seat base that is mountable to an associated automobile; and, (2) a seatback that: (a) is operatively connected to the seat base; (b) has a cavity; and, (c) has an occupant receiving surface; an armrest comprising: (1) first and second surfaces; (2) wherein the first and second surfaces are on opposite sides of the armrest; (3) wherein the first surface is suitable to support at least a portion of an associated occupant's arm; (4) wherein the second surface is suitable to support at least a portion of the associated occupant's trunk; and, (5) an attachment portion that is pivotally attached to the seat assembly; and, a cupholder supported to the armrest and comprising: (1) a cup receiving opening that extends to the first surface of the armrest; (2) a first relative upper wall; and, (3) a second relative lower wall that is movable with respect to the first wall to change the depth of the cupholder. The armrest may be pivotal between: (1) a first position wherein: (a) the cup receiving opening is accessible to receive an associated cup; and, (b) the cupholder has a first depth; and, (2) a second position wherein: (a) at least a portion of the armrest is received in the cavity in the seatback; (b) the second surface of the armrest defines at least a portion of the occupant receiving surface of the seatback and is accessible to support the at least a portion of the associated occupant's trunk; and, (c) the cupholder reduces to a second depth that is less than the first depth when the at least a portion of the associated occupant's trunk is supported to the second surface and consequently a compression force is applied to the second surface.

One advantage of this invention is that an adjustable armrest can have a relatively deep cupholder.

Another advantage of this invention is that an adjustable cupholder may automatically adjust from a relatively smaller depth when the armrest is in an upright position to a relatively larger depth when the armrest is in a down position.

Yet another advantage of this invention is that a cupholder may be used as a cushion.

Other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
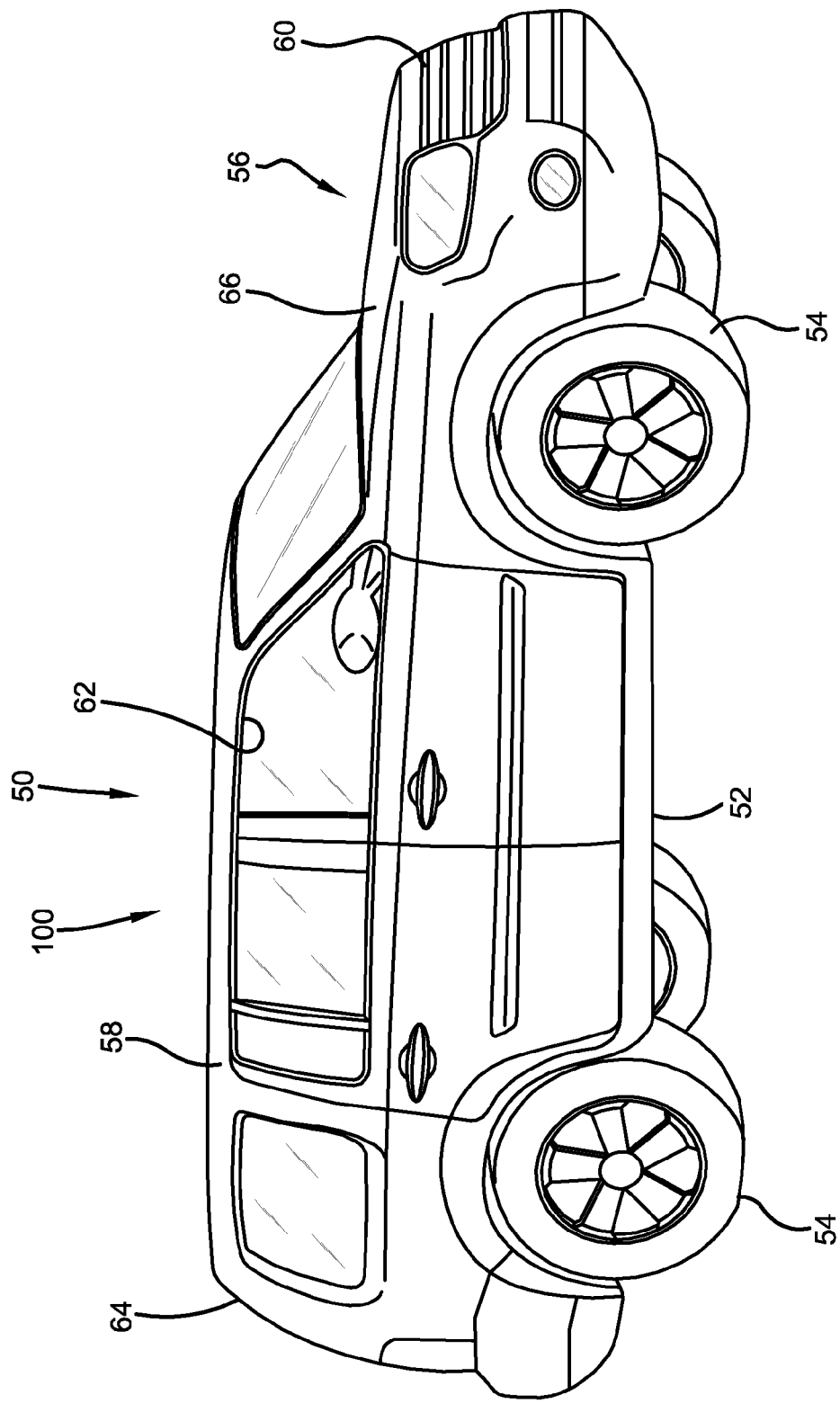
FIG. 1 is a perspective right side view of a vehicle.

Referring now to the drawings wherein the showings are for purposes of illustrating embodiments of the invention only and not for purposes of limiting the same, and wherein like reference numerals are understood to refer to like components, FIG. 1 shows a vehicle 50 that may be equipped with one or more armrests 100 according to this invention. While the vehicle 50 shown is an SUV (Sports Utility Vehicle), it is to be understood that the armrest 100 of this invention will work with any vehicle chosen with the sound judgment of a person of skill in the art, including vans, sedans, off-road vehicles, airplanes and boats and may have non-vehicle applications as well. The vehicle 50 may include a frame 52, one or more ground engaging wheels 54 mounted to the frame 52, and a locomotion source 56, such as an engine or motor, mounted to the frame 52, for use in providing locomotion for the vehicle 50. The vehicle 50 may also have a body 58 mounted to the frame 52 that defines one or more compartments. The body may define, for some non-limiting examples, a locomotion compartment 60 that houses the locomotion source 56, a passenger compartment 62 that houses one or more passengers, and a storage compartment 64 that may be used to house luggage or other cargo. The vehicle 50 may also have at least one door 66 that is moveable with respect to the body 58 between an open position granting access to the interior of the body (and thus may provide access to one or more of the compartments 60, 62, 64) and a closed position preventing access to the interior of the body 58.

Figure 2:
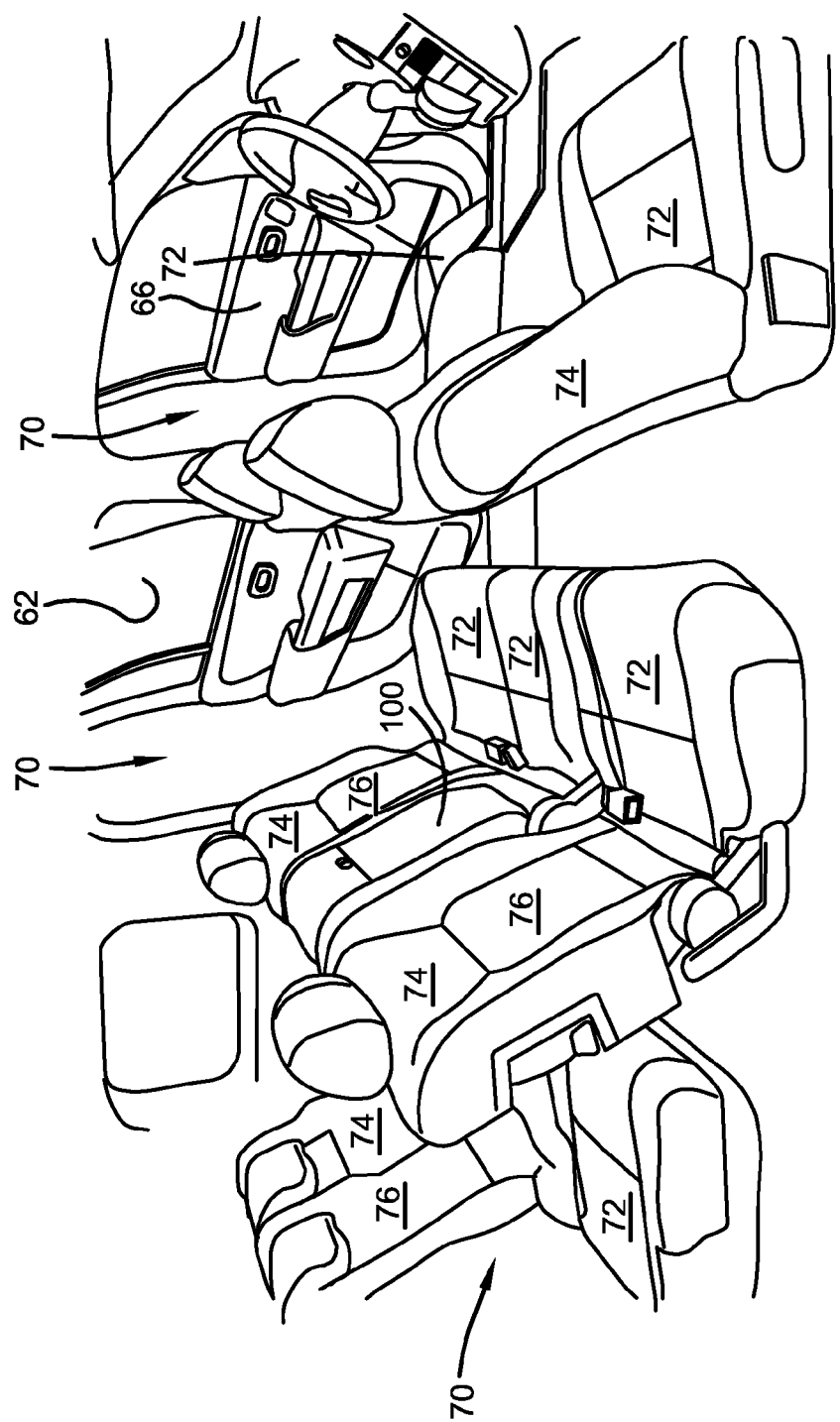
FIG. 2 is perspective right side view of the interior of the vehicle depicted in FIG. 1.
Figure 3:
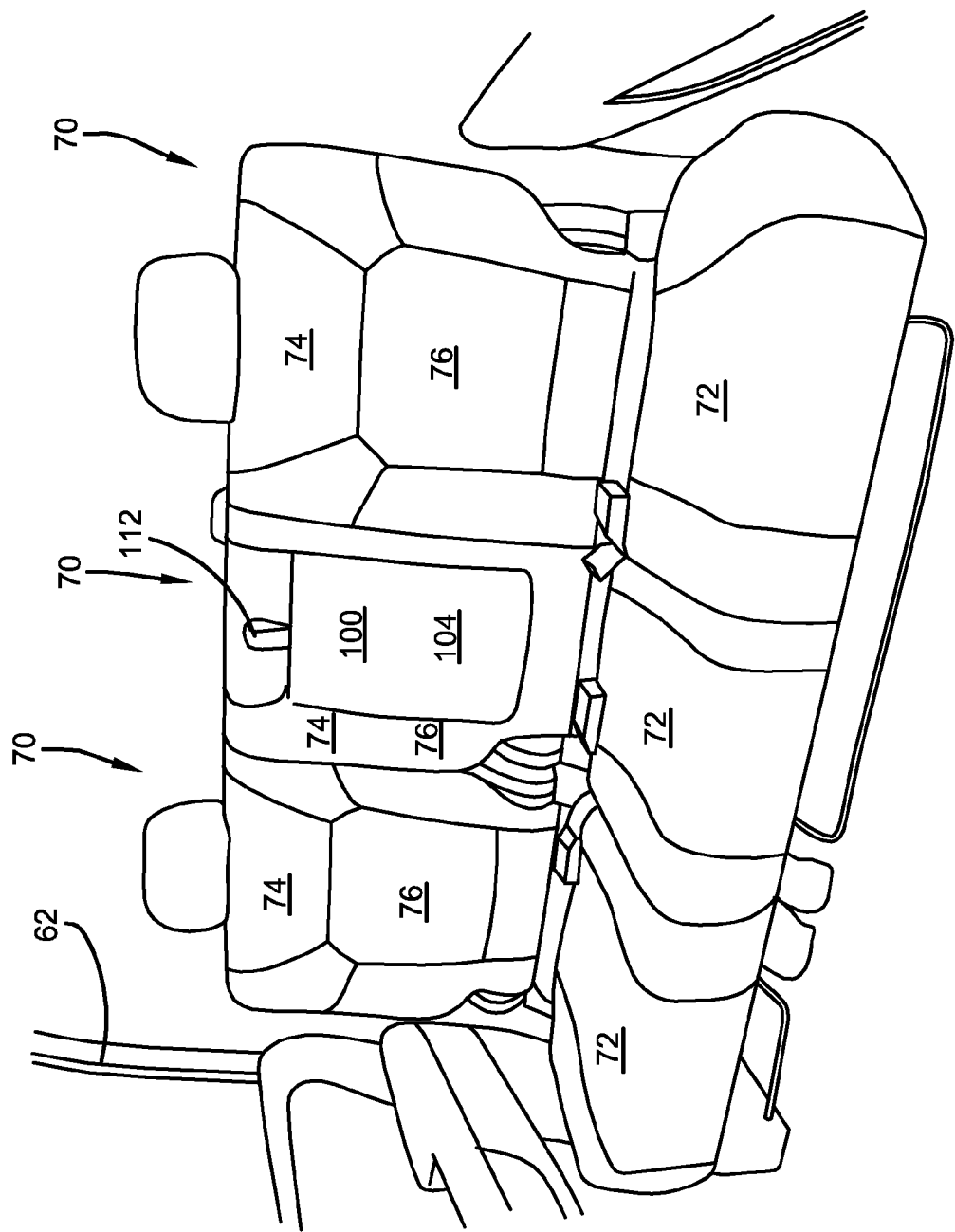
FIG. 3 is a perspective front view of the second row of seat assemblies depicted in FIG. 2 showing the armrest in an upright position.
Figure 4:
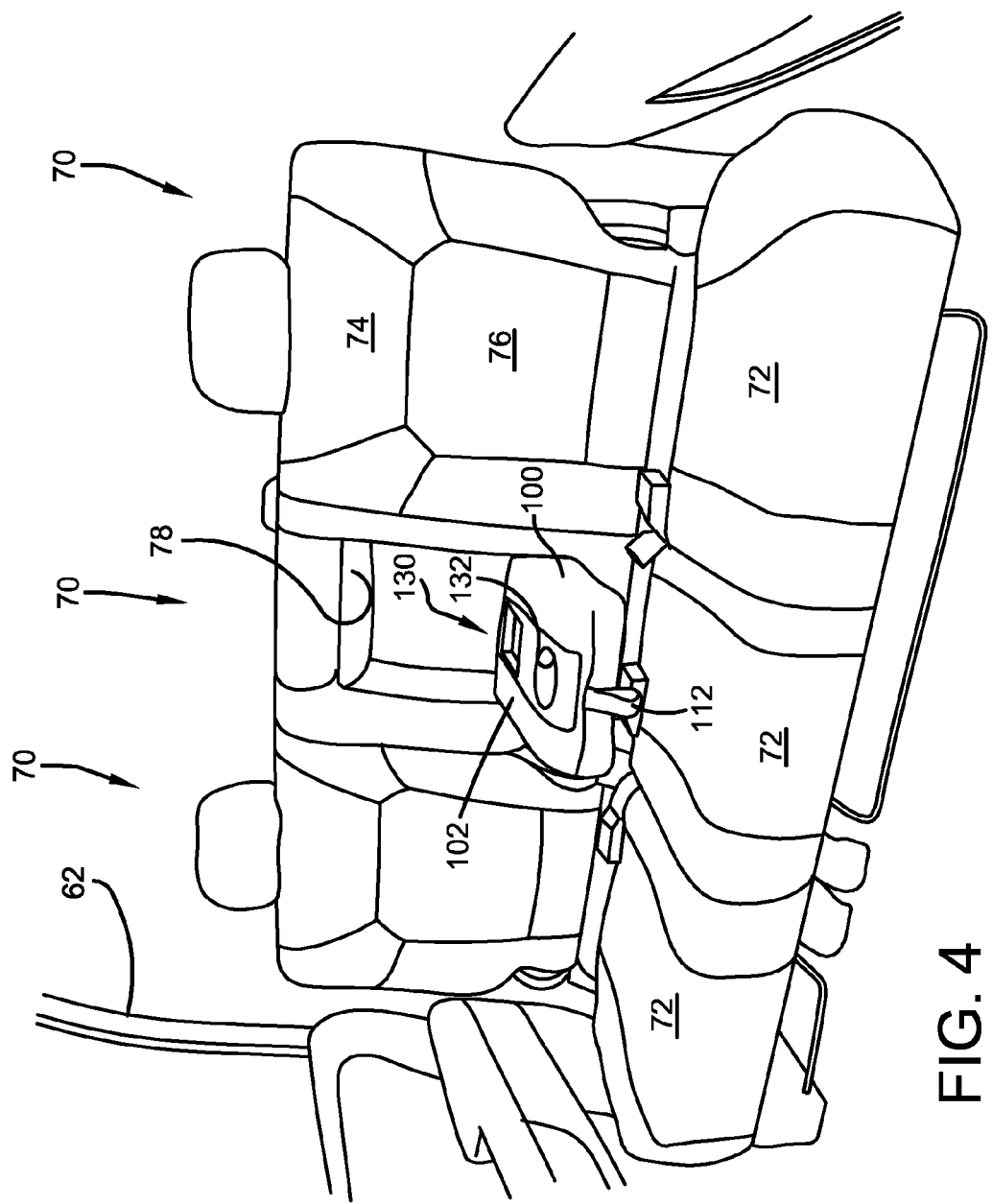
FIG. 4 is a view similar to that shown in FIG. 3 except showing the armrest in a down position.

With reference now to FIGS. 2-4, within the passenger compartment 62 there may be one or more seat assemblies 70 for supporting passengers to the vehicle 50 as is well known to those of skill in the art. The seat assemblies 70 may be of any size and style chosen with the sound judgment of a person of skill in the art such as, for some non-limiting examples, bucket style seats, such as those shown in the front portion of the passenger compartment 62, and bench seat assemblies. As is known to those of skill in the art, an automotive seat assembly 70 may include a seat base 72 that is mountable to the frame 52 and a seatback 74 that is operatively connected to the seat base 72. Each seatback 74 may have an occupant receiving surface 76 that supports an occupant's back (and thus at least a portion of the occupant's weight). A seatback 74 may also have a cavity 78 (shown in FIG. 4) that is used to receive an armrest 100 as will be discussed further below. As the mounting, connections, operation and use of seat assemblies 70 are known to those of skill in the art, further details will not be provided here.

With reference now to FIGS. 3-6, at least one of the seat assemblies 70 may include an armrest 100. The armrest 100 used with this invention can be of any size and style chosen with the sound judgment of a person of skill in the art. For the embodiment shown, the armrest has first and second surfaces 102, 104. The first surface 102 is suitable to support at least a portion of an occupant's arm, as is well known to those of skill in the art. The second surface 104 is suitable to support at least a portion of the weight of the occupant's trunk. For the embodiment shown, the second surface 104 supports the occupant's back but it is also contemplated in other embodiments to support other portions of the occupant's trunk such as, in one non-limiting example, their lower trunk in a sitting position. The relative orientation of the first surface 102 with respect to the second surface 104 can be any chosen with the sound judgment of a person of skill in the art. For the embodiment shown, the first and second surfaces 102, 104 are on opposite sides of the armrest 100.

With continuing reference to FIGS. 3-6, the armrest 100 may also include an attachment portion 106 to attach the armrest 100 to the seat assembly 70 or another portion of the vehicle. While this attachment can be of any type chosen with the sound judgment of a person of skill in the art, for the embodiment shown there is a pivotal connection 108 between the attachment portion 106 and the seatback 74. The armrest 100 may pivot about pivot axis 110, for example. The armrest 100 may be adjustable between a down position (shown in FIG. 4) and an upright position (shown in FIG. 3). When in the down position, the first surface 102 may be accessible so that a neighboring occupant can support his/her arm on it. When in the upright position, the second surface 104 may be accessible so that an occupant can support his/her back on it. If the seatback 74 has a cavity 78, the armrest 100 may be received in the cavity 78 when in the upright position, as shown. The armrest 100 may include a handle 112 for use in adjusting the armrest 100 between the down and upright positions. As the operation and use of an armrest is well known to those of skill in the art, further details will not be provided here.

Figure 5:
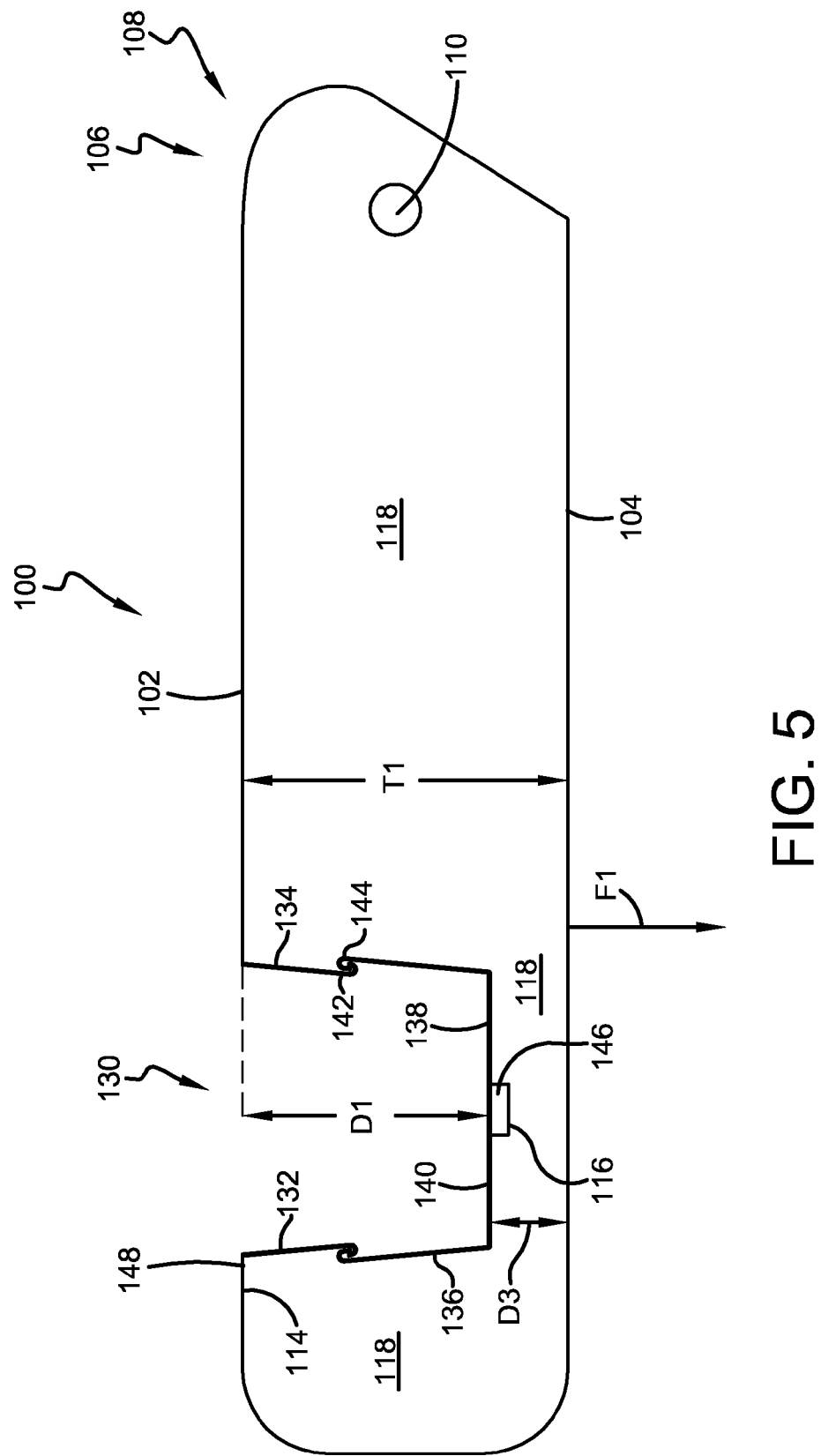
FIG. 5 is a cut-away side view of an armrest showing a cupholder at its maximum depth.
Figure 6:
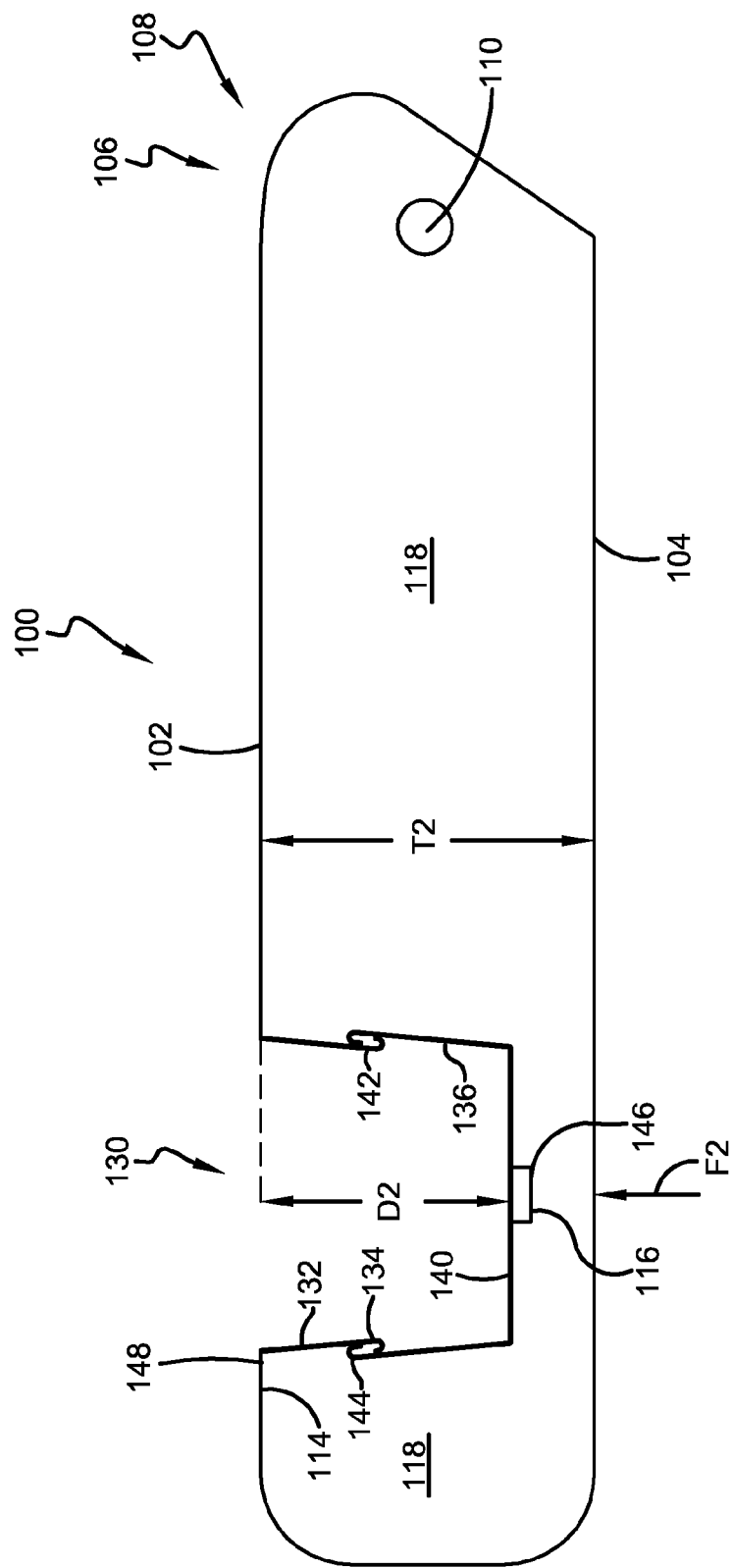
FIG. 6 is a view similar to that shown in FIG. 5 except showing a force applied to the armrest that reduces the depth of the cupholder.
Figure 8:
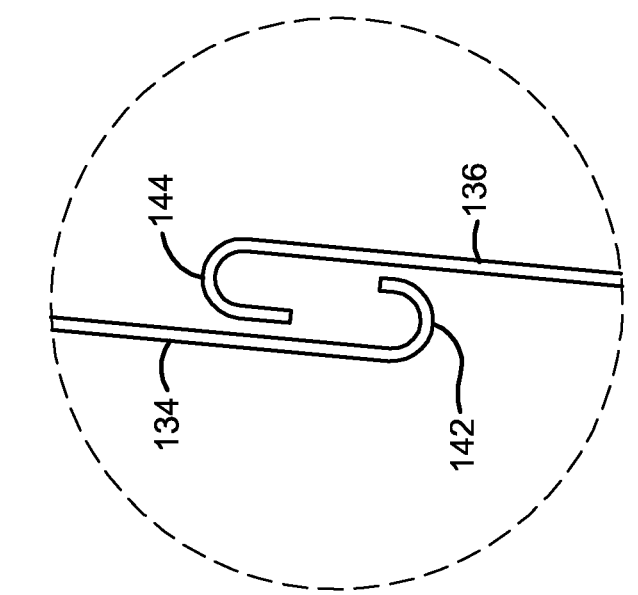
FIG. 8 is a close up view of area A-A depicted in FIG. 7.
Figure 7:
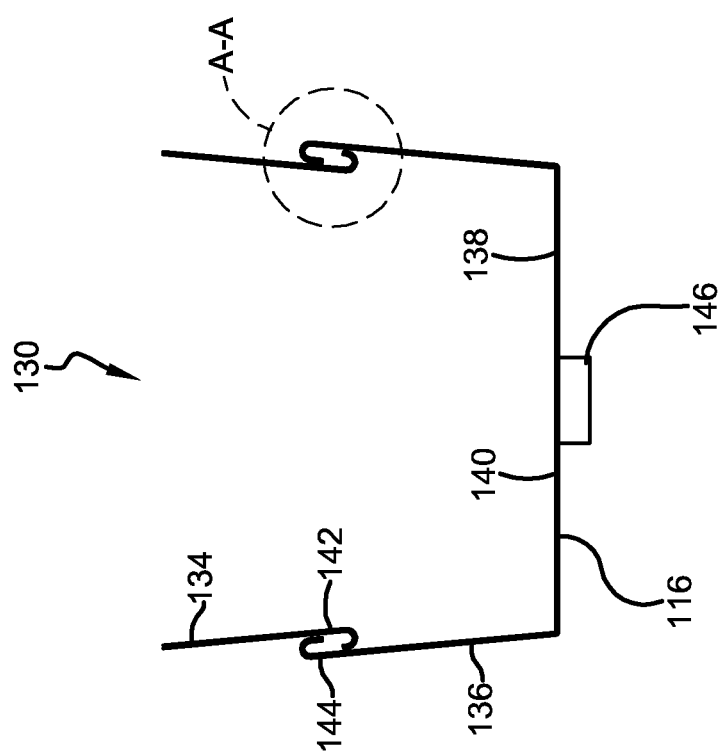
FIG. 7 is a cut-away side view of a cupholder.

With reference now to FIGS. 5-7, a cupholder 130 may be supported to the armrest 100. The cupholder 130 may have an opening 132 that is suitable to receive a beverage container such as a cup, a can, and a bottle but may also be used to receive other items as is well known to those of skill in the art. The opening 132 may extend to the first surface 102 of the armrest 100. The cupholder 130 may include an upper wall 134 and a lower wall 136 that are sized and shaped in any manner chosen with the sound judgment of a person of skill in the art. For the embodiment shown, both the upper and lower walls 132, 134 have a circular cross-section. The cupholder 130 may also include a base 138 that has a surface 140 that is suitable to support a beverage container or other item. For the embodiment shown, the base 138 is attached to the lower wall 136. In one specific embodiment, the base 138 and lower wall 136 are formed together as a single component. The upper wall 132 may be attached to a first portion 114 of the armrest 100 and the lower wall 134 may be attached to a second portion 116 of the armrest 100 so that the lower wall 134 can move relative to the upper wall 134 within the armrest 100. This relative motion permits the cupholder 130 to have an adjustable depth as will be discussed further below. The attachment of the walls 134, 136 to the armrest 100 can be accomplished in any manner chosen with the sound judgment of a person of sill in the art. For the embodiment shown, an upper end 148 of the upper wall 134 is fixed to the first surface 102 of the armrest 100 in a known manner. Also for the embodiment shown, the lower wall 135 is fixed to an intermediate portion of the armrest 100 in a known manner by means of an insert 146 positioned on the bottom of the base 138.

With reference now to FIGS. 5-8, the upper wall 134 may have an engagement portion 142 that engages with an engagement portion 144 of the lower wall 136. These engagement portions 142, 144 may be of any size and style chosen with the sound judgment of a person of skill in the art. For the embodiment shown, the engagement portion 142 is positioned on the lower end of the upper wall 134 and the engagement portion 144 is positioned on the upper end of the lower wall 136 and each of the engagement portions 142, 144 are U-shaped with the engagement portion 144 shown as an inverted U-shape. When the cupholder 130 is positioned in its maximum depth position (D1 FIG. 5) the engagement portions 142, 144 engage each other. This engagement thus limits the maximum depth of the cupholder 130. When the cupholder 130 is positioned in any depth other than its maximum depth (D2 in FIG. 6 shows one example) the engagement portions 142, 144 are disengaged from each other.

With reference now to FIGS. 3-8, the operation of the armrest 100 with cupholder 130 will now be described. If the armrest 100 is in the upright position (FIG. 3), to use the armrest 100 and cupholder 130, it is only necessary to adjust the position of the armrest 100 to the down position (FIG. 4). This may be accomplished by using the handle 112 to pivot the armrest 100 downward in a known manner. When in the down position (FIG. 4) the first surface 102 of the armrest 100 is accessible and thus the cupholder 130 is also accessible. For the embodiment shown, the second surface 104 is not accessible for its typical use in supporting an occupant. Also when in the down position, the cupholder 130 achieves its maximum depth D1 (FIG. 5) because a biasing force F1 moves the lower wall 136 away from the upper wall 134. This biasing force F1 can be created in any manner chosen with the sound judgment of a person of skill in the art. In one embodiment, not shown, a spring can be positioned on or within the armrest 100 and used to create the biasing force F1. For the embodiment shown, the biasing force F1 is created by the material 118 used to form the armrest 100. The material 118 may be, in one non-limiting example, a foam that expands generally outward in a known manner. As the expansion of foams (and other materials that form cushions) used for armrests, seatbacks, chairs and other occupant receiving structures is known to those of skill in the art, further details will not be provided here. In one embodiment, the biasing force F1 is applied automatically, that is, without human involvement. This would be true, for some non-limiting examples, when a spring or foam is used to create the force F1. As noted above, the engagement of the engagement portions 142, 144 limits the maximum depth D1.

With continuing reference to FIGS. 3-8, to move the armrest 100 from the down position (FIG. 4) to the upright position (FIG. 3), the handle 112 may be used to pivot the armrest 100 upward in a known manner. When in the upright position (FIG. 3) the second surface 104 is accessible and, in the shown embodiment, the cupholder 130 is not accessible. The armrest 100 may be positioned within the cavity 78. When in the upright position (FIG. 3) an occupant may support his/her trunk, his/her back in the shown embodiment, to the second surface 104. Thus, the second surface 104 defines a portion of the occupant receiving surface 76 of the seatback 76. As the occupant's weight is placed on the second surface 104, a compression force F2 (FIG. 6) is consequently applied to the second surface 104. This force F2 moves the second surface 104 toward the first surface 102 in a known manner reducing the thickness of the armrest 100 from a first thickness T1 (FIG. 5) to a second thickness T2 (FIG. 6) that is less than the first thickness T1. The actual change in thickness (T1 minus T2) depends on the quantity of the force F2 and on the materials used to make the armrest 100. As the force F2 moves the second surface 104 toward the first surface 102, the force F2 also moves the lower wall 136 of the cupholder 130 toward the first surface 102. This causes the lower wall 136 to move relative to the upper wall 134 reducing the depth of the cupholder 130 from its maximum depth D1 (FIG. 5) to a second depth D2 (FIG. 6) that is less than the depth D1. It should be clear, then, that the cupholder 130 serves (along with the armrest 100) as a cushion for the occupant that uses it. In one embodiment, the combination of the cupholder 130 and the armrest 100 simulates for the occupant (as his/her weight is placed on the second surface 104) the feeling of an armrest having no cupholder. By using the cupholder 130 as part of the cushioning effect for the occupant, the thickness D3 (shown in FIG. 5) of the armrest 100 between the second surface 104 and the bottom of the cupholder can be made smaller than known cupholders positioned in adjustable armrests. As the occupant removes his/her weight from the second surface 104, and consequently removes the compression force F2 from the second surface 104, the cupholder 130 automatically returns to its maximum depth D1 because of the biasing force F1. The cupholder 130 thus may, in one embodiment, maintain its maximum depth D1 when the armrest 100 is in the down position, when it is in the upright position with no occupant using the second surface 104, and as the armrest 100 is adjusted between the down and upright positions.

Numerous embodiments have been described, hereinabove. It will be apparent to those skilled in the art that the above methods and apparatuses may incorporate changes and modifications without departing from the general scope of this invention. The materials used to make the armrest and cupholder can be any chosen with the sound judgment of a person of skill in the art. It is intended to include all such modifications and alterations in so far as they come within the scope of the appended claims or the equivalents thereof.

I claim:

1. An apparatus comprising:
   an armrest having first and second surfaces and wherein: (1) the first surface is suitable to support at least a portion of an associated occupant's arm; and, (2) the second surface is suitable to support at least a portion of the associated occupant's torso;
   a cupholder supported to the armrest and having a cup receiving opening that extends to the first surface of the armrest, wherein the cupholder comprises a first relative upper wall and a second relative lower wall that is movable and substantially coaxial with respect to the first wall to change the depth of the cupholder; and,
   wherein the armrest is adjustable between: (1) a first position wherein: (a) the cup receiving opening is accessible to receive an associated cup; (b) the cupholder has a first depth; and (c) the first relative upper wall is closer to the first surface than the second relative lower wall; and, (2) a second position wherein: (a) the second surface is accessible to support the at least a portion of the associated occupant's torso; (b) the cup receiving opening is not accessible; and, (c) the cupholder reduces to a second depth that is less than the first depth when a compression force is applied to the second surface by the associated occupant's torso.

2. The apparatus of claim 1 wherein the cupholder automatically increases from the second depth to the first depth when the compression force is removed from the second surface.

3. The apparatus of claim 2 wherein at least a portion of a material from which the armrest is substantially formed forces the cupholder from the second depth to the first depth when the compression force is removed from the second surface.

4. The apparatus of claim 1 wherein, with the armrest in the second position, the first relative upper wall and the second relative lower wall overlap by substantially different amounts between (1) the associated occupant's torso being supported to the second surface, and (2) the associated occupant's torso being not supported to the second surface.

5. The apparatus of claim 1 wherein an amount of overlap between the first relative upper wall and the second relative lower wall changes as the armrest is adjusted from (1) the second position to (2) the first position with the associated cup inserted into the cup receiving opening.

6. The apparatus of claim 1 wherein the cupholder comprises a base having a surface suitable to support the associated cup and the base is attached to the second wall.

7. The apparatus of claim 1 wherein the reduction of the cupholder depth from the first depth to the second depth simulates the feeling of an armrest having no cupholder for the associated occupant when the at least a portion of the associated occupant's torso is supported to the second surface.

8. An apparatus comprising:
an armrest having first and second surfaces and wherein: (1) the first surface is suitable to support at least a portion of an associated occupant's arm; and, (2) the second surface is suitable to support at least a portion of the associated occupant's torso; and
a cupholder supported to the armrest and having a cup receiving opening that extends to the first surface of the armrest, wherein the cupholder comprises a first relative upper wall and a second relative lower wall that is movable with respect to the first wall to change the depth of the cupholder;
wherein the armrest is adjustable between: (1) a first position wherein: (a) the cup receiving opening is accessible to receive an associated cup; and, (b) the cupholder has a first depth; and, (2) a second position wherein: (a) the second surface is accessible to support the at least a portion of the associated occupant's torso; (b) the cup receiving opening is not accessible; and, (c) the cupholder reduces to a second depth that is less than the first depth when a compression force is applied to the second surface by the associated occupants torso;
wherein the first relative upper wall and the second relative lower wall are substantially coaxial and overlap at least partially in a direction perpendicular to the coaxial axis; and
wherein at least a portion of the first relative upper wall and at least a portion of the second relative lower wall face the associated cup that is received in the cup receiving opening when the armrest is in the first position.

9. An apparatus comprising:
an armrest having first and second surfaces and wherein: (1) the first surface is suitable to support at least a portion of an associated occupant's arm; and, (2) the second surface is suitable to support at least a portion of the associated occupant's torso; and
a cupholder supported to the armrest and having a cup receiving opening that extends to the first surface of the armrest, wherein the cupholder comprises a first relative upper wall and a second relative lower wall that is movable with respect to the first wall to change the depth of the cupholder;
wherein the armrest is adjustable between: (1) a first position wherein: (a) the cup receiving opening is accessible to receive an associated cup; and, (b) the cupholder has a first depth; and, (2) a second position wherein: (a) the second surface is accessible to support the at least a portion of the associated occupant's torso; (b) the cup receiving opening is not accessible; and, (c) the cupholder reduces to a second depth that is less than the first depth when the at least a portion of the associated occupant's torso is supported to the second surface and consequently a compression force is applied to the second surface;
wherein the first wall comprises a first engagement portion and the second wall comprises a second engagement portion;
wherein the first and second engagement portions engage each other when the cupholder has the first depth; and,
wherein the first and second engagement portions are disengaged from each other when the cupholder has the second depth.

10. A method comprising the steps of:
(A) providing an armrest having first and second surfaces and wherein: (1) the first surface is suitable to support at least a portion of an associated occupant's arm; and, (2) the second surface is suitable to support at least a portion of the associated occupant's torso;
(B) providing a cupholder supported to the armrest and having a cup receiving opening that extends to the first surface of the armrest and wherein the cupholder comprises a first relative upper wall and a second relative lower wall that is movable and substantially coaxial with respect to the first wall;
(C) providing the armrest in a first position where (1) the cup receiving opening is accessible to receive an associated cup, (2) the first relative upper wall is closer to the first surface than the second relative lower wall, and (3) the cupholder has a first depth;
(D) adjusting the armrest into a second position where the second surface is accessible and the cup receiving opening is not accessible; and,
(E) supporting the at least a portion of the occupant's torso to the second surface of the armrest and: (1) applying a compression force onto the second surface; and, (2) moving the second wall with respect to the first wall to reduce the depth of the cupholder to a second depth that is less than the first depth.

11. The method of claim 10 wherein after step (E) the method comprises the steps of:
moving the occupant's torso away from the second surface and consequently removing the compression force from the second surface; and,
automatically returning the cupholder depth to the first depth.

12. The method of claim 10 wherein:
step (A) comprises the step of: providing the armrest on a seatback of a seat assembly; and,
step (B) comprises the step of: providing the first and second surfaces to be on opposite sides of the armrest.

13. The method of claim 10 wherein:
step (A) comprises the step of: providing the armrest on a seatback of a seat assembly; and,
step (D) comprises the step of: pivoting the armrest with respect to the seatback.

14. The method of claim 10 wherein:
step (B) comprises the step of: providing the first wall with a first engagement portion and the second wall with a second engagement portion;
step (C) comprises the step of: engaging the first engagement portion to the second engagement portion; and,
step (E) comprises the step of: disengaging the first engagement portion from the second engagement portion.

15. The method of claim 10 wherein step (E) comprises the step of:
simulating the feeling of an armrest having no cupholder for the associated occupant when the at least a portion of the associated occupant's torso is supported to the second surface.

16. An apparatus comprising:
an automotive seat assembly comprising:

(1) a seat base that is mountable to an associated automobile; and,
(2) a seatback that: (a) is operatively connected to the seat base; (b) has a cavity; and, (c) has an occupant receiving surface;

an armrest comprising:
(1) first and second surfaces;
(2) wherein the first and second surfaces are on opposite sides of the armrest;
(3) wherein the first surface is suitable to support at least a portion of an associated occupant's arm;
(4) wherein the second surface is suitable to support at least a portion of the associated occupant's torso; and,
(5) an attachment portion that is pivotally attached to the seat assembly;

a cupholder supported to the armrest and comprising:
(1) a cup receiving opening that extends to the first surface of the armrest;
(2) a first relative upper wall; and,
(3) a second relative lower wall that is movable and substantially coaxial with respect to the first wall to change the depth of the cupholder; and, wherein the armrest is pivotal between:
(1) a first position wherein: (a) the cup receiving opening is accessible to receive an associated cup; (b) the cupholder has a first depth; and (c) the first relative upper wall is closer to the first surface than the second relative lower wall; and,
(2) a second position wherein: (a) at least a portion of the armrest is received in the cavity in the seatback; (b) the second surface of the armrest defines at least a portion of the occupant receiving surface of the seatback and is accessible to support the at least a portion of the associated occupant's torso; and, (c) the cupholder reduces to a second depth that is less than the first depth when a compression force is applied to the second surface by the associated occupants torso.

17. The apparatus of claim 16 wherein when the armrest is in the second position, the cup receiving opening is not accessible.

18. The apparatus of claim 17 wherein the cupholder automatically increases from the second depth to the first depth when the compression force is removed from the second surface.

19. The apparatus of claim 18 wherein the reduction of the cupholder depth from the first depth to the second depth simulates the feeling of an armrest having no cupholder for the associated occupant when the at least a portion of the associated occupant's torso is supported to the second surface.

20. The apparatus of claim 16 wherein:
the first wall comprises a first engagement portion and the second wall comprises a second engagement portion;
the first and second engagement portions engage each other when the cupholder has the first depth; and,
the first and second engagement portions are disengaged from each other when the cupholder has the second depth.

* * * * *